(12) United States Patent
Matsuda

(10) Patent No.: US 8,651,468 B2
(45) Date of Patent: Feb. 18, 2014

(54) TUBULAR VIBRATION-DAMPING MOUNT

(75) Inventor: Naohisa Matsuda, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 53 days.

(21) Appl. No.: 13/264,107

(22) PCT Filed: Mar. 29, 2010

(86) PCT No.: PCT/JP2010/002257
§ 371 (c)(1),
(2), (4) Date: Dec. 30, 2011

(87) PCT Pub. No.: WO2010/119629
PCT Pub. Date: Oct. 21, 2010

(65) Prior Publication Data
US 2012/0091643 A1 Apr. 19, 2012

(30) Foreign Application Priority Data
Apr. 13, 2009 (JP) .................................. 2009-097416

(51) Int. Cl.
*F16M 13/00* (2006.01)
(52) U.S. Cl.
USPC ................................................... 267/140.13
(58) Field of Classification Search
USPC ................. 267/140.11–140.15; 248/550, 636
See application file for complete search history.

(56) References Cited

U.S. PATENT DOCUMENTS

| | | | |
|---|---|---|---|
| 6,357,731 B1 | 3/2002 | Tanahashi | |
| 7,334,783 B2 * | 2/2008 | Yoneyama et al. | 267/140.13 |
| 7,341,244 B1 * | 3/2008 | Adams | 267/140.13 |
| 8,056,888 B2 * | 11/2011 | Siemer et al. | 267/140.5 |
| 2005/0236752 A1 * | 10/2005 | Winkler | 267/140.13 |

FOREIGN PATENT DOCUMENTS

| | | |
|---|---|---|
| JP | 57-169837 U | 10/1982 |
| JP | 2001-050333 A | 2/2001 |
| JP | 2001-165219 A | 6/2001 |
| JP | 2006-046393 A | 2/2006 |
| JP | 2006-200643 A | 8/2006 |

OTHER PUBLICATIONS

International Search Report for PCT/JP2010/002257, dated Jun. 22, 2010.
Chinese Office Action, dated Apr. 3, 2013, issued in corresponding Chinese Application No. 201080022955.7.
Japanese Office Action, dated Mar. 19, 2013, issued in corresponding Japanese Patent Application No. 2009-097416.
Chinese Office Action dated Nov. 25, 2013 issued in corresponding Chinese Patent Application No. 201080022955.7.

* cited by examiner

*Primary Examiner* — Christopher Schwartz
(74) *Attorney, Agent, or Firm* — Sughrue Mion, PLLC

(57) ABSTRACT

The present invention provides a tubular vibration-damping mount capable of securing durability against an input in a direction perpendicular to an axis. A tubular vibration-damping mount comprises a core member, a tubular member, a rubber member, an upper surface of which has, as viewed in a cross section including an axis of the core member, a recessed portion in a radially inner direction of the rubber member and an inclined portion whose inclination angle is smoothly and upwardly increased in the radially inner direction from a point on the tubular member as a starting point, and a bracket, wherein the tubular member has, in an area higher than a lower end of an adhesion surface between the tubular member and the rubber member and the upper surface of the rubber member starts from a point on the inner periphery of the diameter-enlarged portion of the tubular member, which the point agrees with the starting point.

3 Claims, 7 Drawing Sheets

US 8,651,468 B2

TUBULAR VIBRATION-DAMPING MOUNT

CROSS REFERENCE TO RELATED APPLICATION

This application is a National Stage of International Application No. PCT/JP2010/002257 filed Mar. 29, 2010, claiming priority based on Japanese Patent Application No. 2009-097416, filed Apr. 13, 2009, the contents of all of which are incorporated herein by reference in their entirety.

TECHNICAL FIELD

The present invention relates to a tubular vibration-damping mount comprising: a core member; a tubular member located below the core member and having an inside diameter larger than an outside diameter of the core member; a rubber member located between the core member and the tubular member to couple the core member and the tubular member by vulcanization adhesion, an upper surface of the rubber member having, as viewed in a cross section including an axis of the core member, a recessed portion in a radially inner direction of the rubber member and an inclined portion whose inclination angle is smoothly and upwardly increased in the radially inner direction from a point on the tubular member as a starting point; and a bracket supporting an outer periphery of the tubular member with the tubular member being inserted. In particular, the present invention relates to a tubular vibration-damping mount capable of securing durability against an input in a direction perpendicular to an axis.

RELATED ART

FIG. 1 is a sectional view showing a conventional tubular vibration-damping mount. A tubular vibration-damping mount 90 comprises a core member 91, a tubular member 92 located below the core member 91 and having an inside diameter larger than an outside diameter of the core member 91, a rubber member 93 located between these members 91 and 92 to couple these members 91 and 92, and a bracket 94 supporting an outer periphery of the tubular member 92 with the tubular member 92 being inserted. An upper surface 93a of the rubber member 93 has, as viewed in a cross section including an axis C of the core member 91, a recessed portion 93b in a radially inner direction of the rubber member 93 and an inclined portion whose inclination angle is smoothly and upwardly increased in the radially inner direction from a point on the tubular member as a starting point 93c.

In the conventional tubular vibration-damping mount 90, the upper surface 93a of the rubber member starts from a point on an inner tubular surface 92a of the tubular member 92 or a corner 92b which is an end of the inner tubular surface 92a, which the point or the corner 92b agrees with the above-mentioned starting point 93c.

When there is an input in the direction perpendicular to the axis C to thus-configured tubular vibration-damping mount 90, stress for tearing the rubber member 93 from the tubular member 92 is focused on the starting point 93c on the upper surface 93a of the rubber member 93, which results in a problem that adhesion durability is deteriorated.

In order to secure durability against an input in the direction perpendicular to the axis C, which the input serves to tear the starting point 93c on the upper surface 93a of the rubber member 93 from the tubular member 92, as shown in a sectional view of a tubular vibration-damping mount 90A in FIG. 2, for example, it is only necessary that the upper surface 93a of the rubber member extends downward from a point on the inner tubular surface 92a of the tubular member 92 or the starting point 93c at the corner 92b of the end of the inner tubular surface 92a, extends horizontally by gradually changing the inclination angle and extends upward from the lowest point P. In this case, the input in the direction perpendicular to the axis C is absorbed by up-and-down movement of the lowest point P so that the impact on the starting point 93c which the most easily comes off since the starting point 93c is a termination end of the adhesion surface with the tubular member 92 is significantly relaxed.

However, in this case, if a product is demolded from a mold after the rubber member 93 is vulcanized to be adhered in the mold, the mold would become extremely complicated due to a recessed portion 93b in a radially inner direction on the upper surface 93a of the rubber member 93.

In case of the tubular vibration-damping mount 90 as shown in FIG. 1, a mold 99 shown in two-dot chain just has to consist of several segments arranged in the circumferential direction. When these segments are moved in the radially inner and outer directions, the mold 99 can be opened and closed. However, in case of the tubular vibration-damping mount 90A as shown in FIG. 2, if a mold 99A shown in two-dot chain consists of several segments arranged in the circumferential direction, a mold portion corresponding to the recessed portion including the lowest point P on the upper surface 93a of the rubber member cannot be removed due to interference with the product. On the other hand, in order to solve this problem, in case that the mold 99A is configured in such a way that the mold 99A is opened and closed by moving in the up-and-down direction, a mold portion corresponding to the recessed portion 93b in the radially inner direction on the upper surface 93a of the rubber member interferes with a product and cannot be removed. Therefore, in order to demold the product from the mold 99A, the mold has to have an extremely complicated structure.

In order to solve this problem, a tubular vibration-damping mount (for example, see patent document 1) whose sectional view is shown in FIG. 3 is proposed. Similar to the tubular vibration-damping mount 90, a tubular vibration-damping mount 80 comprises a core member 81, a tubular member 82 located below the core member 81 and having an inside diameter larger than an outside diameter of the core member 81, a rubber member 83 located between these members 81 and 82 to couple these members 81 and 82, and a bracket 84 supporting an outer periphery of the tubular member 82 with the tubular member 82 being inserted. An upper surface 83a of this rubber member 83 has a recessed portion 83b in a radially inner direction of the rubber member 83.

The tubular member 82 comprises a tubular portion 82a having an inner periphery and an outer periphery, each of which has a constant radius and a narrowed portion 82b extending from an upper end of the tubular portion 82a toward the radially inner direction and again extending back to the radially outer direction. An upper surface 83a of the rubber member 83 has, as viewed in a cross section including an axis C, an inclined portion whose inclination angle is smoothly and upwardly increased in the radially inner direction from an upper end of the narrowed portion 82b of the tubular member 82 as a starting point 83c.

In other words, the upper surface 83a of the rubber member 83 extends from the upper end of the narrowed portion 82b of the tubular member 82 as the starting point 83c along the surface of the tubular member 82 and then extends gradually apart from the tubular member 82. In this case, stress of the input in the direction perpendicular to the axis C is absorbed by movement of a point on the upper surface 83a apart from the starting point 83c so that the impact on the starting point 83c which the most easily comes off since the starting point 83c is a termination end of the adhesion surface with the tubular member 82 is relaxed.

However, in this tubular vibration-damping mount 80, a length along the shortest distance from the rubber member 83 on the tubular member 82 to the rubber member 83 on the core member 81, that is, a free length becomes a distance from a point Q2 on the narrowed portion 82b to a point Q1 on the core member 81. If this free length L is short, it becomes difficult to absorb stress against an external force along this shortest distance, as a result of which a problem occurs that durability of the rubber member 83 itself is deteriorated since the narrowed portion 82b is formed.

Patent Document

[Patent Document 1] JP3489500(B2)

DISCLOSURE OF THE INVENTION

Problems to be Solved by the Invention

The object of the present invention is to solve the above-mentioned problems and to provide a tubular vibration-damping mount capable of securing durability against an input in a direction perpendicular to an axis.

Means for Solving the Problem

The invention according to claim 1 is a tubular vibration-damping mount comprising: a core member; a tubular member located below the core member and having an inside diameter larger than an outside diameter of the core member; a rubber member located between the core member and the tubular member to couple the core member and the tubular member by vulcanization adhesion, an upper surface of the rubber member having, as viewed in a cross section including an axis of the core member, a recessed portion in a radially inner direction of the rubber member and an inclined portion whose inclination angle is smoothly and upwardly increased in the radially inner direction from a point on the tubular member as a starting point; and a bracket supporting an outer periphery of the tubular member with the tubular member being inserted, wherein the tubular member has, in an area higher than a lower end of an adhesion surface between the tubular member and the rubber member, a straight cylindrical portion which has an inner periphery and an outer periphery, both of which are parallel to an axis of the tubular member and a diameter-enlarged portion which has an inner periphery extending from an upper end of the straight cylindrical portion and smoothly enlarging the inside diameter of the tubular member and the upper surface of the rubber member starts from a point on the inner periphery of the diameter-enlarged portion of the tubular member, which the point agrees with the starting point.

The invention according to claim 2 is a tubular vibration-damping mount in the invention according to claim 1, wherein the outer periphery of the diameter-enlarged portion comprises a surface straight extending from the outer periphery of the straight cylindrical portion.

The invention according to claim 3 is a tubular vibration-damping mount in the invention according to claim 1, wherein the outer periphery of the diameter-enlarged portion comprises a surface whose diameter is smoothly increased from the outer periphery of the straight cylindrical portion and the bracket comprises a guide portion having an inside diameter larger than the largest outside diameter of the diameter-enlarged portion and a constant inside diameter portion located above the guide portion and having an inside diameter to engaging the outside diameter of the straight cylindrical portion in a posture of supporting the tubular member.

The invention according to claim 4 is a tubular vibration-damping mount in the invention according to claim 3, wherein the bracket comprises a diameter-changed portion located between the guide portion and the constant inside diameter portion and whose inside diameter is gradually changed.

Effect of the Invention

According to the invention of claim 1, since the upper surface of the rubber member starts from a point on the inner periphery of the diameter-enlarged portion of the tubular member, which the point agrees with the starting point, when there is an input in a direction perpendicular to an axis, stress of this input is absorbed at a point on the upper surface apart from the starting point. Therefore, the impact on the starting point which the most easily comes off since the starting point is a termination end of the adhesion surface with the tubular member is relaxed so that durability can be sufficiently secured.

In addition, the tubular member has, in an area higher than a lower end of an adhesion surface between the tubular member and the rubber member, a straight cylindrical portion which has an inner periphery and an outer periphery, both of which are parallel to an axis and a diameter-enlarged portion which has an inner periphery extending from an upper end of the straight cylindrical portion and smoothly enlarging the inside diameter of the tubular member, that is to say, the tubular member does not have a narrowed portion which is constricted in the radially inner direction in the area higher than the lower end of the adhesion surface between the tubular member and the rubber member so that durability of the rubber member itself can be also sufficiently secured.

According to the invention of claim 2, since the outer periphery of the diameter-enlarged portion comprises a surface straight extending from the outer periphery of the straight cylindrical portion, the tubular member can be easily inserted into the bracket.

According to the invention of claim 3, since the bracket comprises a guide portion having an inside diameter larger than the largest outside diameter of the diameter-enlarged portion and a constant inside diameter portion located above the guide portion and having an inside diameter to engaging the outside diameter of the straight cylindrical portion in a posture of supporting the tubular member, when the tubular member is inserted into the bracket, the diameter-enlarged portion of the tubular member can be easily inserted into the bracket.

According to the invention of claim 4, since the bracket comprises a diameter-changed portion located between the guide portion and the constant inside diameter portion and whose inside diameter is gradually changed, the diameter of the diameter-enlarged portion of the tubular member can be easily decreased elastically so that assembly work can be further simplified.

BEST MODE FOR CARRYING OUT THE INVENTION

Figure 1:
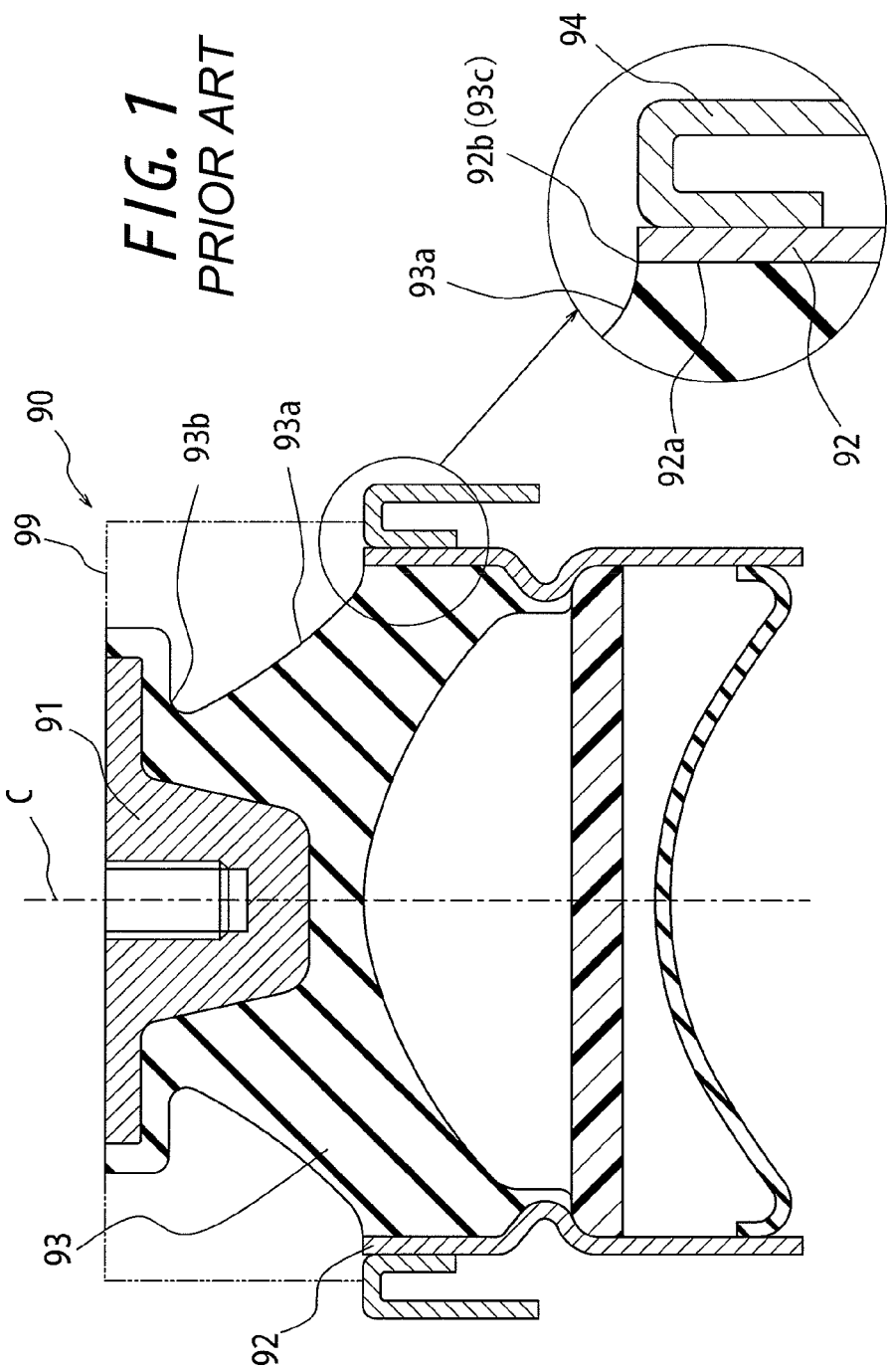
FIG. 1 is a sectional view showing a conventional tubular vibration-damping mount.
Figure 2:
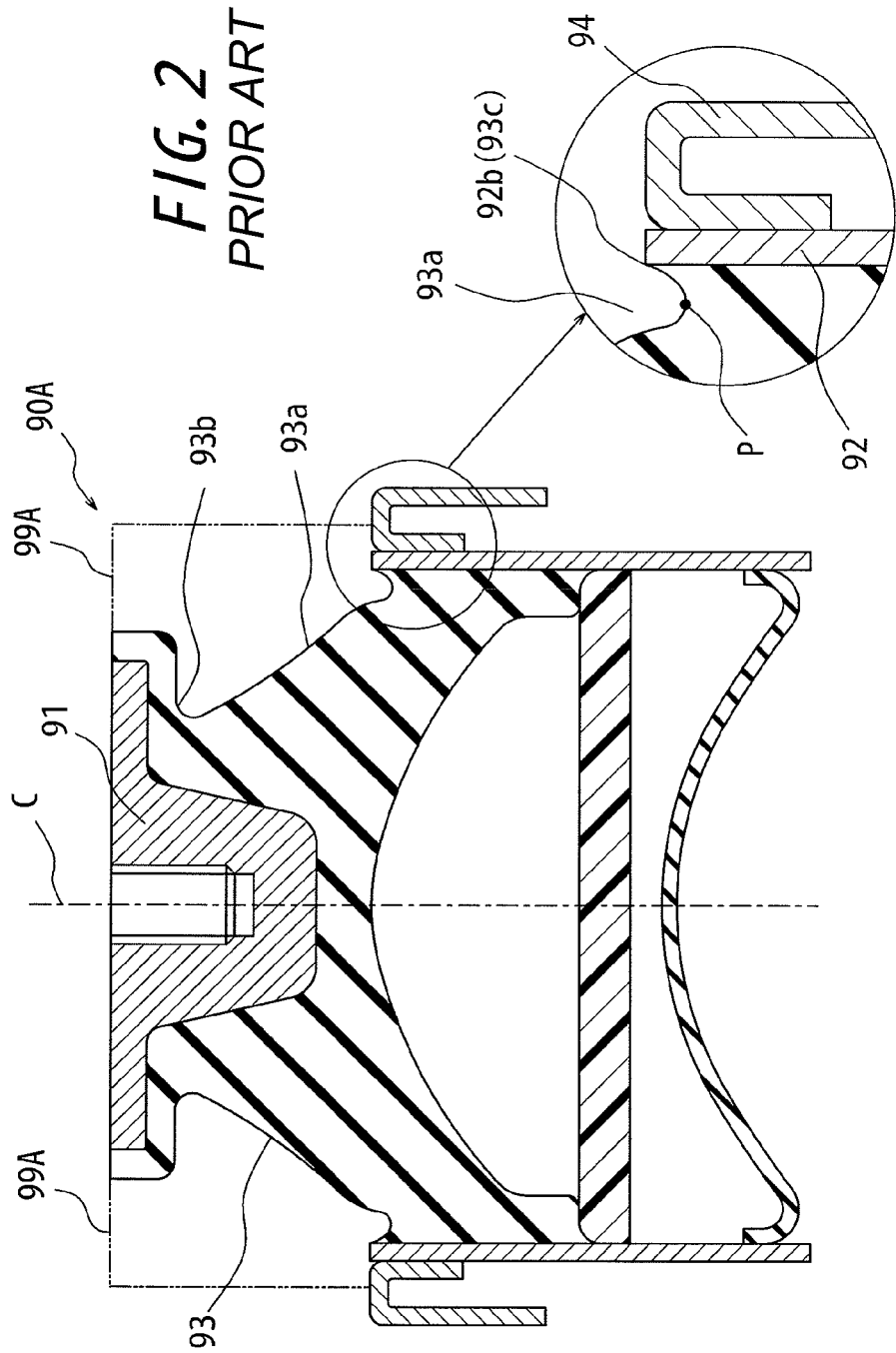
FIG. 2 is a sectional view showing another conventional tubular vibration-damping mount.
Figure 3:
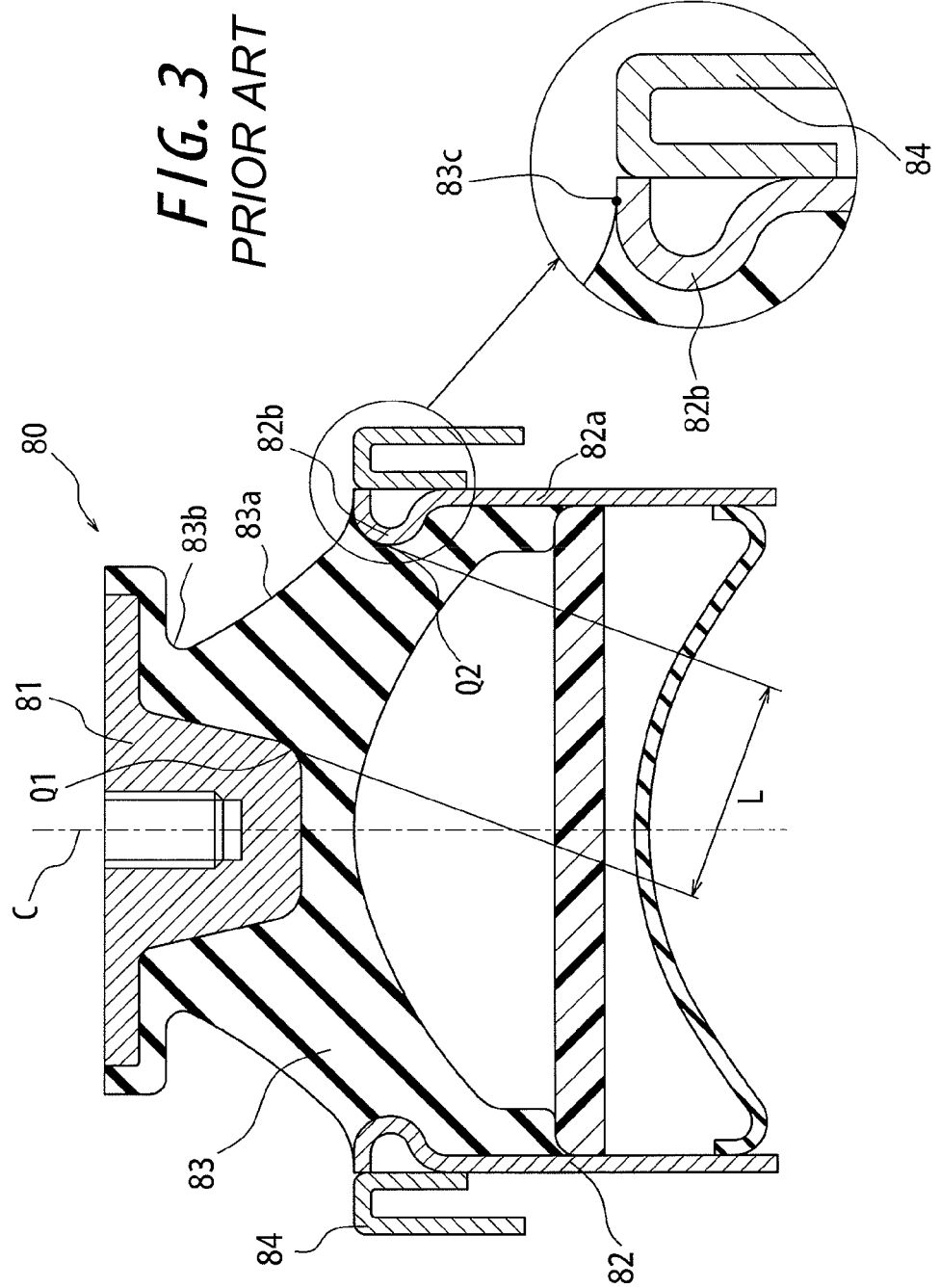
FIG. 3 is a sectional view showing another conventional tubular vibration-damping mount.
Figure 4:
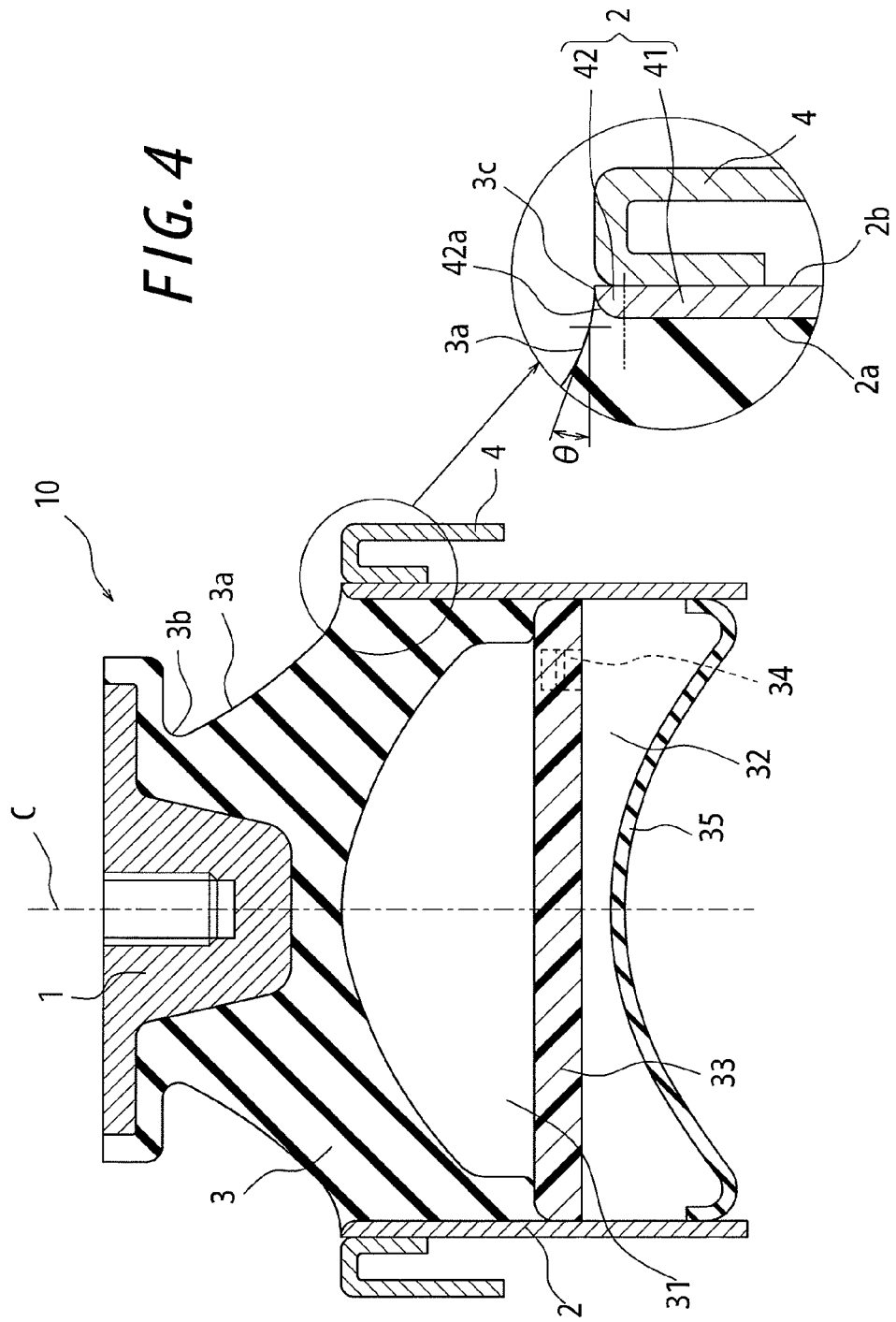
FIG. 4 is a sectional view showing a tubular vibration-damping mount of the first embodiment according to the present invention.

Embodiments of the present invention will be explained with reference to drawings. FIG. 4 is a sectional view showing a tubular vibration-damping mount of the first embodiment. A tubular vibration-damping mount 10 comprises a core member 1, a tubular member 2 located below the core member 1 and having an inside diameter larger than an outside diameter of the core member 1, a rubber member 3 located between these members 1 and 2 to couple these members 1 and 2 by vulcanization adhesion, and a bracket 4 supporting an outer periphery of the tubular member 2 with the tubular member 2 being inserted. An upper surface 3a of this rubber member 3 has a recessed portion 3b in a radially inner direction of the rubber member 3.

In this tubular vibration-damping mount 10, the tubular member 2 has, in an area higher than a lower end of an adhesion surface between the tubular member 2 and the rubber member 3, a straight cylindrical portion 41 which has an inner periphery 2a and an outer periphery 2b, both of which are parallel to an axis C and a diameter-enlarged portion 42 which has an inner periphery 42a extending from an upper end of the straight cylindrical portion 41 and smoothly enlarging the inside diameter of the tubular member 2.

The upper surface 3a of the rubber member 3 has, as viewed in a cross section including the axis C, an inclined portion whose inclination angle θ is smoothly and upwardly increased in the radially inner direction from a point on the inner periphery of the diameter-enlarged portion 42 of the tubular member 2 as a starting point 3c. In this case, it is preferable that the starting point 3c is located near the highest end among points on the inner periphery of the diameter-enlarged portion 42.

In this tubular vibration-damping mount 10 having the above-mentioned characteristics, since the starting point 3c of the upper surface 3a of the rubber member is located on the diameter-enlarged portion 42 of the tubular member 2, when there is an input in the direction perpendicular to the axis C, stress is absorbed at a point on the upper surface 3a apart from the starting point 3c. Therefore, the stress-focusing on the starting point 3c which the most easily comes off since the starting point 3c is a termination end of the adhesion surface with the tubular member 2 is relaxed so that durability can be sufficiently secured.

In addition, the tubular member 2 does not have a narrowed portion which is constricted in the radially inner direction so that a free length of the rubber member can be longer and durability of the rubber member itself can be also sufficiently secured.

Figure 5:
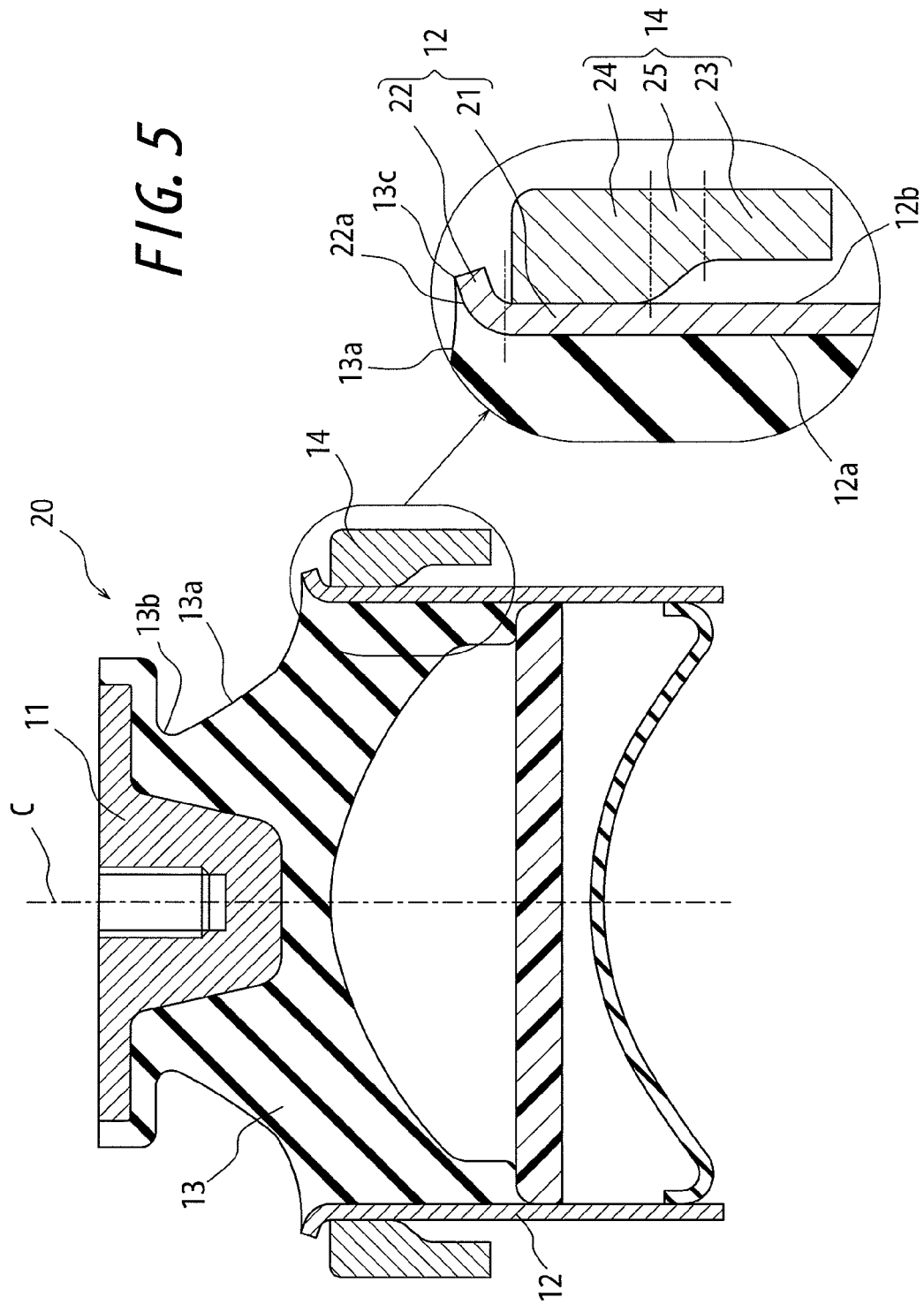
FIG. 5 is a sectional view showing a tubular vibration-damping mount of the second embodiment according to the present invention.

FIG. 5 is a sectional view showing a tubular vibration-damping mount of the second embodiment. Similar to the tubular vibration-damping mount 10, a tubular vibration-damping mount 20 also comprises a core member 11, a tubular member 12 located below the core member 11 and having an inside diameter larger than an outside diameter of the core member 11, a rubber member 13 located between these members 11 and 12 to couple these members 11 and 12 by vulcanization adhesion, and a bracket 14 supporting an outer periphery of the tubular member 12 with the tubular member 12 being inserted. An upper surface 13a of this rubber member 13 has a recessed portion 13b in a radially inner direction of the rubber member 13.

Also in this tubular vibration-damping mount 20, the tubular member 12 has, in an area higher than a lower end of an adhesion surface between the tubular member 12 and the rubber member 13, a straight cylindrical portion 21 which has an inner periphery 12a and an outer periphery 12b, both of which are parallel to an axis C and a diameter-enlarged portion 22 which has an inner periphery 22a extending from an upper end of the straight cylindrical portion 21 and smoothly enlarging the inside diameter of the tubular member 12. The bracket 14 comprises a guide portion 23 having an inside diameter larger than the largest outside diameter of the diameter-enlarged portion 22 and a constant inside diameter portion 24 located above the guide portion 23 and having an inside diameter to engaging the straight cylindrical portion 21 in a posture of supporting the tubular member 12.

Figure 6:
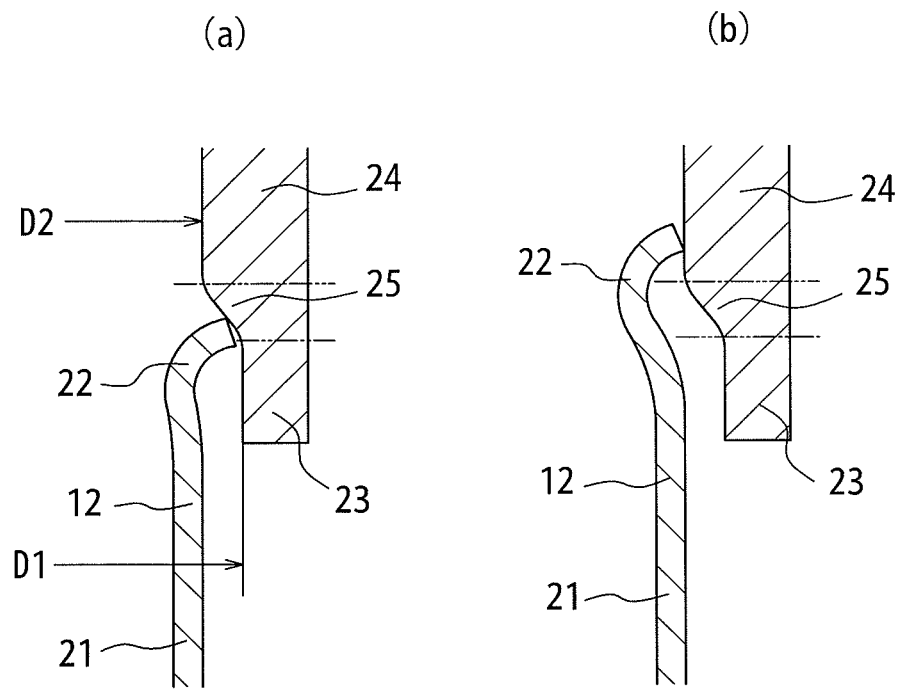
FIG. 6 is a sectional view showing a state in the process of inserting a tubular member into a bracket in a tubular vibration-damping mount of the second embodiment.

According to this configuration, in the tubular vibration-damping mount 20, when the tubular member 2 having the diameter-enlarged portion 22 is inserted into the bracket 14, as shown in FIGS. 6(a) and 6(b), the diameter-enlarged portion 22 of the tubular member 12 can be easily inserted into the bracket 14.

In other words, in the area between the guide portion 23 and the constant inside diameter portion 24, by providing a diameter-changed portion 25 whose inside diameter is gradually changed from the inside diameter D1 of the guide portion 23 to the inside diameter D2 of the constant inside diameter portion 24, the diameter of the diameter-enlarged portion 22 of the tubular member 12 can be easily decreased elastically from the state without deformation through the state shown in FIG. 6(a) to the state shown in FIG. 6(b) so that assembly work can be further simplified.

In the tubular vibration-damping mount 20, the upper surface 13a of the rubber member 13 has, as viewed in a cross section including the axis C, an inclined portion whose inclination angle is smoothly and upwardly increased in the radially inner direction from an upper end of the diameter-enlarged portion 22 of the tubular member 12 as a starting point 13c.

According to this configuration, in the tubular vibration-damping mount 20, when there is an input in the direction perpendicular to the axis C, stress is absorbed at a point on the upper surface 13a apart from the starting point 13c. Therefore, the stress-focusing on the starting point 13c which the most easily comes off since the starting point 13c is a termination end of the adhesion surface with the tubular member 12 is relaxed so that durability can be sufficiently secured. In this case, it is preferable that the starting point 13c is located near the highest end among points on the inner periphery of the diameter-enlarged portion 22.

Also in this tubular vibration-damping mount 20, similar to the tubular vibration-damping mount 10, the tubular member 12 does not have a narrowed portion which is constricted in the radially inner direction so that a free length of the rubber member can be longer and durability of the rubber member itself can be also sufficiently secured.

In addition, the first and second embodiments respectively shown in FIGS. 4 and 5 are so-called liquid sealed vibration damping devices, in which a partition member 33 is liquid-tightly attached inside of the tubular members 2, 12, a membrane member 35 capable of being flexibly deformed is disposed below the partition member 33, a main liquid chamber 31 consisting of a space surrounded by the rubber members 3, 13 and the partition member 33 and an auxiliary liquid chamber 32 consisting of a space surrounded by the membrane member 35 and the partition member 33 are respectively filled with liquid, the main liquid chamber 31 and the auxiliary liquid chamber 32 are communicated through an orifice 34 formed in the partition member 33, and the capacity of the main liquid chamber 31 varies due to relative displacement of the tubular members 2, 12 and the core members 1, 11 in the axial direction, whereby liquid moves though the orifice 34 forming a narrow flow path so that the effect of preventing vibration can be achieved.

Figure 7:
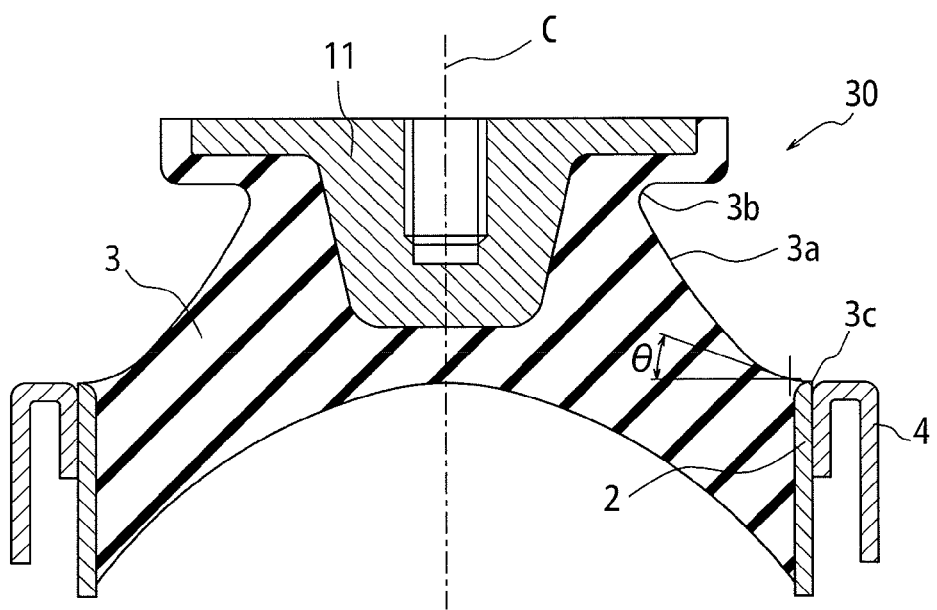
FIG. 7 is a sectional view showing a tubular vibration-damping mount of another example of the first embodiment.

A tubular vibration-damping mount of the present invention is not limited to liquid sealed vibration damping devices shown in the first and second embodiments but can be applicable to a tubular vibration-damping mount 30 which is another example of the first embodiment, in which the element shown in a cross sectional view in FIG. 7 having the same function is denoted by the same reference numeral as that in FIG. 4. The tubular vibration-damping mount 30 dampens vibration only with the damping effect of the rubber member 3 without a liquid chamber. Also in this case, the upper surface 3a of the rubber member 3 has, as viewed in a cross section including the axis C, an inclined portion whose inclination angle θ is smoothly and upwardly increased in the radially inner direction from a point on the upper end surface 2a of the tubular member 2 as a starting point 3c.

INDUSTRIAL APPLICABILITY

The tubular vibration-damping mount according to the present invention can be used as, for example, an engine mount and a body mount of a car.

DESCRIPTION OF REFERENCE NUMERALS 1 core member
2 tubular member
2a inner periphery of straight cylindrical portion of tubular member
2b outer periphery of straight cylindrical portion of tubular member rubber member
3a upper surface of rubber member
3b recessed portion of rubber member in radially inner direction
3c starting point of upper surface of rubber member
4 bracket
10 tubular vibration-damping mount
11 core member
12 tubular member
12a upper end surface of tubular member
13 rubber member
13a upper surface of rubber member
13b radially inwardly recessed portion of rubber member
13c starting point of upper surface of rubber member
14 brackets
20 tubular vibration-damping mount
21 straight cylindrical portion of tubular member
22 diameter-enlarged portion of tubular member
22a inner periphery of diameter-enlarged portion
23 guide portion of bracket
24 constant inside diameter portion of bracket
25 diameter-changed portion of bracket
30 tubular vibration-damping mount
31 main liquid chamber
32 auxiliary liquid chamber
33 partition member
34 orifice
35 membrane member
41 straight cylindrical portion of tubular member
42 diameter-enlarged portion of tubular member
42a inner periphery of diameter-enlarged portion of tubular member
C axis

The invention claimed is:

1. A tubular vibration-damping mount comprising:
a core member;
a tubular member located below the core member and having an inside diameter larger than an outside diameter of the core member;
a rubber member located between the core member and the tubular member to couple the core member and the tubular member by vulcanization adhesion, an upper surface of the rubber member having, as viewed in a cross section including an axis of the core member, a recessed portion in a radially inner direction of the rubber member and an inclined portion whose inclination angle is smoothly and upwardly increased in the radially inner direction from a point on the tubular member as a starting point; and
a bracket supporting an outer periphery of the tubular member with the tubular member being inserted;
wherein
the tubular member has, in an area higher than a lower end of an adhesion surface between the tubular member and the rubber member,
a straight cylindrical portion which has an inner periphery and an outer periphery, both of which are parallel to an axis of the tubular member and
a diameter-enlarged portion which has an inner periphery extending from an upper end of the straight cylindrical portion and smoothly enlarging the inside diameter of the tubular member and
the starting point is on the inner periphery of an outside diameter enlarged portion of the tubular member, and
wherein the diameter-enlarged portion has a largest outside diameter larger than a diameter of the straight cylindrical portion and an outer periphery of the diameter-enlarged portion comprises a surface whose diameter is smoothly increased from the outer periphery of the straight cylindrical portion; and
the bracket comprises
a guide portion having an inside diameter larger than the largest outside diameter of the diameter-enlarged portion and
a constant inside diameter portion located above the guide portion and having a constant inside diameter smaller than the largest outside diameter of the diameter-enlarged portion, the constant inside diameter portion engaging the outside diameter of the straight cylindrical portion to support the tubular member.

2. The tubular vibration-damping mount according to claim 1, wherein
the outer periphery of the diameter-enlarged portion comprises a surface straight extending from the outer periphery of the straight cylindrical portion.

3. The tubular vibration-damping mount according to claim 2, wherein the bracket comprises a diameter-changed portion located between the guide portion and the constant inside diameter portion and whose inside diameter is gradually changed.

\* \* \* \* \*